US007842177B2

(12) United States Patent
Tazzia

(10) Patent No.: US 7,842,177 B2
(45) Date of Patent: *Nov. 30, 2010

(54) SOLID PIGMENTED RESIN-CROSSLINKER MIXTURE FOR USE IN AQUEOUS COATINGS

(75) Inventor: Charles L. Tazzia, Grosse Pointe Farms, MI (US)

(73) Assignee: BASF Coatings GmbH, Muenster (DE)

( * ) Notice: Subject to any disclaimer, the term of this patent is extended or adjusted under 35 U.S.C. 154(b) by 477 days.

This patent is subject to a terminal disclaimer.

(21) Appl. No.: 11/926,712

(22) Filed: Oct. 29, 2007

(65) Prior Publication Data
US 2008/0272005 A1    Nov. 6, 2008

Related U.S. Application Data

(63) Continuation-in-part of application No. 11/381,410, filed on May 3, 2006, now Pat. No. 7,790,011.

(51) Int. Cl.
*C25D 9/02* (2006.01)
*C08L 63/00* (2006.01)
*B05D 1/00* (2006.01)

(52) U.S. Cl. .................. 205/317; 427/458; 427/475; 427/485; 523/402; 523/414; 523/428

(58) Field of Classification Search .................. None
See application file for complete search history.

(56) References Cited

U.S. PATENT DOCUMENTS

| 4,168,180 | A | * | 9/1979 | Peabody | 524/577 |
| 4,333,807 | A | * | 6/1982 | Suzuki et al. | 204/488 |
| 6,291,579 | B1 | * | 9/2001 | Kalck et al. | 524/832 |
| 6,534,568 | B1 | * | 3/2003 | Katz et al. | 523/212 |
| 2007/0270526 | A1 | * | 11/2007 | Tazzia | 523/414 |

FOREIGN PATENT DOCUMENTS

WO     WO 01/28306 A2 *   4/2001

* cited by examiner

*Primary Examiner*—Michael J Feely
(74) *Attorney, Agent, or Firm*—Harness, Dickey & Pierce, P.L.C.

(57) ABSTRACT

A pigmented granular pigmented coating feedstock is prepared by melting a resin, which can be a solid resin based on polymerizable ethylenically unsaturated monomer or epoxy based resin, and a solid or viscous curing agent, blending the molten mass, and cooling to form a solid. The solid blend of resin and curing agent is ground to produce a granular feedstock. The feedstock is readily storable or shippable to a location for coating preparation. Alternatively a solid coating can be ground after shipping. An aqueous coating is made by dispersing the feedstock in water and mixing to form a dispersion. A salting agent and at least one additive can be added to form an aqueous coating composition. An article can be coated with the dispersion, for example, by electrodeposition.

19 Claims, No Drawings

US 7,842,177 B2

SOLID PIGMENTED RESIN-CROSSLINKER MIXTURE FOR USE IN AQUEOUS COATINGS

CROSS-REFERENCE TO RELATED APPLICATION

This application is a Continuation-in-Part of U.S. patent application Ser. No. 11/381,410, filed May 3, 2006, now U.S. Pat. No. 7,790,011.

FIELD OF THE INVENTION

The invention relates to methods for preparing pigmented aqueous coating compositions, especially electrodepositable aqueous dispersion coating compositions. In another aspect, the invention relates to methods in which solid resin-crosslinker mixtures are stored or shipped prior to incorporation into an aqueous coating composition.

BACKGROUND OF THE INVENTION

Aqueous coating compositions are used in a variety of applications in the automotive coatings industry. They advantageously provide reduced organic emissions, lower toxicity, and a reduced fire hazard. The aqueous coatings are, in general, "dispersions" or two-phase systems of a finely divided solid or liquid in a continuous medium. As used herein, "dispersion" refers to two-phase systems of one or more finely divided solids, liquids or combinations thereof in a continuous liquid medium such as water or a mixture of water and organic cosolvent. "Emulsion" as used herein refers to a dispersion of liquid droplets in a liquid medium, preferably water or a mixture of water and various cosolvents. Accordingly, the term "dispersion" will be used in this description to include an "emulsion."

Aqueous coating dispersions may be used as electrodeposition coatings, primers, sealers, basecoats, enamels, and/or topcoats. Various resins and binders may be used in aqueous coating dispersions, including but not limited to, epoxy based resins, acrylic resins, polyester resins, alkyds, polyurethanes, polyurethane adducts, and the like. A "resin," as used herein, includes a "material," which is not formed of repeating units; an "oligomer" formed of repeating units and having a molecular weight <1000 g/mol; and, a "polymer" having repeating units and having a molecular weight >1000 g/mol.

Electrodeposition coating compositions and methods are widely used in industry today. In the electrodeposition coating process, electrically charged coating particles are plated or deposited out of an aqueous dispersion onto a conductive substrate. Electrodeposition can be anodic or cathodic; typically the article to be coated serves as the cathode. Electrodeposition or "electrocoat" processes are advantageous both economically and environmentally, due to the high transfer efficiency of solid coating to substrate and low levels of organic solvent. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness.

Electrocoat baths usually comprise an aqueous dispersion of a film-forming resin, such as an epoxy or acrylic resin, having ionic stabilization. For automotive or industrial applications, in which hard electrocoat films are desired, the electrocoat compositions are formulated to be curable compositions. This is usually accomplished by including in the electrocoat bath a curing agent, also known as a crosslinking agent, that can react with functional groups on the resin under appropriate conditions (such as with the application of heat and/or UV radiation) and thus cure the coating. During electrodeposition, coating material containing an ionically-charged resin is deposited onto a conductive substrate by submerging the substrate in an electrocoat bath having dispersed therein the charged resin and then applying an electrical potential between the substrate and a pole of opposite charge, for example, a stainless steel electrode. The charged coating dispersion migrates to and deposits on the conductive substrate. The coated substrate is then heated to cure the coating.

Problems relating to aqueous coatings involve handling and preparation of the aqueous coating components and prepared dispersions. An aqueous coating dispersion that contains a significant amount of aqueous solvent—the aqueous coating can sometimes include from 50% to 80% water—adds considerable weight, volume, and cost in transportation. While a coating composition can be prepared from individual components at the site where it is to be produced or applied, the individual components would then need to be measured, combined, and blended using particular methods in order to form proper dispersions. It takes too much time and can be too complex to manufacture a coating composition from its individual components on site. A need, therefore, exists for a less expensive and easier way to provide an aqueous coating to a customer.

SUMMARY

The present description provides methods of preparing an aqueous pigmented coating composition. In various embodiments, preparing the coating composition includes forming a granular coating feedstock by mixing a crosslinkable resin and a curing agent. The crosslinkable resin and curing agent are mixed at or above the melting points of the resin and agent to form a homogeneous, molten blend that is subsequently cooled to form a solid blend. The granular coating feedstock is produced by crushing or grinding the solid blend into a granular form. The feedstock is then combined with a salting agent, one or more additives, and water and mixed to form an aqueous coating composition.

In various embodiments the method can further include adding a pigment or dye to the coating composition by one of, adding pigment during a molten phase of the composition or by dry-blending pigment with granular resin and crosslinker, or by combining dye with the resin. Examples of suitable dyes that may be combined with the resin as described herein include metallized and non-metallized substituted porphryins and phthalocyanines.

In various embodiments the method can further include storing and/or shipping the granular coating feedstock prior to forming a dispersion. The feedstock can be stored below its melting temperature to reduce sintering of the granulate. Other embodiments involve preparing a granular coating feedstock by mixing a crosslinkable resin and a curing agent at or above the melting point of the resin and agent, but below the thermal curing reaction temperature. In still other embodiments, forming a coating feedstock involves cooling a molten blend of resin and curing agent to a temperature where the blend is brittle and grinding to form a granular or powdered coating feedstock.

Embodiments further include methods of preparing aqueous coating compositions by mixing a resin and a curing agent at or above the melting points of the resin and curing agent. The molten resin and curing agent are then mixed to form a homogeneous blend and cooled to form a solid. The solid blend of resin and curing agent can be stored and/or shipped to a coating preparation site. The solid resin and curing agent are ground at the coating preparation site to form a granular coating feedstock. The granular feedstock can then be dispersed into an aqueous medium.

Various other embodiments include methods of producing an aqueous coating composition by forming a granular, solid resin-crosslinker mixture, shipping the granular, solid resin-crosslinker mixture to a desired site, and dispersing the mixture in water to produce a coating composition. These embodiments include aspects of forming a granular, solid resin-crosslinker mixture by providing a resin and a curing agent; blending the resin and agent to homogeneity at a temperature where both are molten, but lower than the thermal cure temperature of the mixture; cooling the blended resin and agent until solid; and grinding the solid into a granular or powdered form. An aqueous coating composition is produced by dispersing the granular, solid resin-crosslinker mixture, a salting agent, and at least one additive in water.

Embodiments of the present methods include receiving a solid feedstock, which comprises resin and curing agent, and dispersing the feedstock in an aqueous medium to form a coating composition. The solid feedstock may include pigment or alternatively, preparation of a coating composition can further include the addition of one or more additives, such as salting agents and pigments. The feedstock and any additives are mixed in an aqueous medium to form a dispersion. Dispersions in various embodiments include coating compositions used in electrodeposition.

In other embodiments, an article is coated with the coating dispersion. In certain of these embodiments, the method for coating the article is electrodeposition.

The present invention affords various benefits over the prior art. Such benefits include significant savings in shipping costs for a solid coating feedstock versus an aqueous coating. Introducing the aqueous solvent medium, which can be from 50% to 80% of the coating composition in some instances, at the point of use saves considerable weight, volume, and energy in transport. Furthermore, the pre-mixed resin and curing agent can have low solubility or substantially no solubility in water without the addition of a salting agent. In the event of a spill, the low solubility or substantially no solubility of the resin-crosslinker mixture adds a measure of safety in transport of the material, in that the mixture will remain solid, facilitating cleanup and posing less risk to the environment. In addition, a pre-mixed granular, solid resin-crosslinker mixture simplifies preparation of a coating composition at a coating preparation facility, where it is readily soluble in water upon addition of a salting agent and/or other additives. These are distinct advantages over prior art methods for preparing, handling, and supplying aqueous coating compositions.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring such parameters.

DETAILED DESCRIPTION

Further areas of applicability and advantages will become apparent from the following description. It should be understood that the description and specific examples, while exemplifying various embodiments of the invention, are intended for purposes of illustration only and are not intended to limit the scope of the invention.

An aqueous coating composition is prepared by forming a granular coating feedstock. Forming a feedstock includes mixing a resin, pigment and a curing agent at a mixing temperature at or above the melting points of the resin and agent to form a homogenous molten blend. The molten blend is subsequently cooled to form a solid blend and ground to produce a granular coating feedstock.

In another embodiment, forming a feedstock includes mixing a resin and a curing agent at a mixing temperature at or above the melting points of the resin and agent to form a homogenous molten blend. The molten blend is subsequently cooled to form a solid blend and ground into a powdered or granular form and mixed with a pigment to form the solid pigmented resin-crosslinker mixture.

In another embodiment forming a feedstock includes mixing a resin and a curing agent at a mixing temperature at or above the melting points of the resin and agent to form a homogenous molten blend. The molten blend is subsequently cooled to form a solid blend and ground into a powdered or granular form and mixed with a pigment to form the solid pigmented resin-crosslinker mixture.

In this embodiment, if the coating composition is intended as an electrocoat composition, it may be desirable that the pigment be rendered ionic by an ionic surface treatment, which may be cationic or anionic depending on the desired ionic composition for the electrocoat deposition. If the electrocoat will be cationic, then the pigment surface treatment will be cationic and if the electrocoat will be anionic then the pigment surface treatment will be anionic. Alternatively, in the dispersion process the pigment may be rendered electrodepositable by an additive or dispersant that would associate with the pigment and render it electrodepositable.

In another embodiment, forming a feedstock includes combining a dye, resin and curing agent until homogenous at a temperature wherein the resin and curing agent are molten, cooling the blended resin and curing agent until solid to form a solid resin-curing agent mixture, grinding the solid resin-curing agent mixture into a powdered or granular form. Optionally the powdered or granular solid resin-curing agent mixture may be mixed with a pigment.

A feedstock capable of forming an aqueous coating composition is formed by mixing a water-dispersible resin and a curing agent. The resin and agent are mixed at a temperature at or above the melting point of the resin and agent to form a homogeneous molten blend. The molten blend is then cooled to form a solid blend and ground to produce the feedstock. The water-dispersible resin may be dispersible in water due to ionizable groups in the resin. Additionally, the curing agent can be water-dispersible.

The water-dispersible resin may include nonionizable groups that impart or improve water-dispersibility, nonlimiting examples of which are polyoxyethylene groups, beta- and gamma-carbamate groups, and hydroxyethylene ethyl urea groups. The resin may include a sufficient number of such groups to be water-dispersible.

Suitable resins include epoxy oligomers and polymers, such as polymers and oligomers of polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl)ethane, bis(2-hydroxynaphthyl)methane and the like. The polyglycidyl ethers and polyhydric phenols are condensed together to form the oligomers or polymers.

Other useful polyepoxide compounds are those made from novolak resins or similar polyhydroxyphenol resins. Also suitable are polyglycidyl ethers of polyhydric alcohols such as ethylene glycol, propylene glycol, diethylene glycol and triethylene glycol. Also useful are polyglycidyl esters of polycarboxylic acids which are produced by the reaction of epichlorohydrin or a similar epoxy compound with an aliphatic or aromatic polycarboxylic acid such as succinic acid and terepthalic acid.

Preferably, the resin can be a reaction product of a liquid epoxy such as diglycidyl ether of bisphenol A (DGEBA) and bisphenol A. Preferred examples include modified upgraded epoxy resins having epoxy equivalent weights of approximately 100 to 1200 or more. Suitable liquid epoxies are GY2600, commercially available from Huntsman, and Epon® 828, commercially available from Hexion Specialty Chemicals, Inc. For example, epoxy-containing compounds can be reacted with hydroxyl-containing compounds, such as bisphenol A, ethoxylated bisphenol A, phenol, polyols, or substituted polyols. The reaction products can be further reacted with an amine containing compound, such as methylaminoethanol, diethanol amine, or the diketamine derivative of diethylenetriamine, to provide a salting site on the resin for use in cathodic electrocoating. Alternatively, quaternium ammonium, sulfonium, or phosphonium sites can be incorporated. Or, the reaction products can be reacted with an acid functionality to make anodic electrocoating compositions.

The resin can also include a mixture of such compounds with groups reactive with a curing agent. The mixture of compounds can include more than one type of resin with groups reactive with a curing agent, a resin with one or more co-monomers, and more than one resin with at least one co-monomer.

Other suitable resins include polymerizable, ethylenically unsaturated monomers and the resins formed therefrom. For example, polymerizable, ethylenically unsaturated monomers are typically liquid or highly viscous at room temperature, while a resin formed by polymerization of the monomers can be solid or nearly solid at room temperature. The polymerization reaction can also include a monomer with a saltable group, such as an acid (for anodic electrocoating compositions) or an amine (for cathodic electrocoating compositions), during the polymerization step. The resin contains groups that are further reactive and crosslinkable with a curing agent. Groups that may be reactive with the curing agent include, without limitation, active hydrogen groups, oxirane groups, carbodiimide groups, acetoacetoxy groups, hydroxyl groups, and unsaturated primary and secondary amines.

Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; acid-functional monomers including acrylic acid, methacrylic acid, and crotonic acid; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Examples of other monomers that can be used to provide crosslinkable functionality include, without limitation, glycidyl acrylate, glycidyl methacrylate, acetoacetoxybutyl methacrylate, acetoacetoxyethyl acrylate, and carbodiimide methacrylate. The hydrogen-functional monomers can also be derivatized with an amine, such as a secondary amine, to make the monomers cationic and saltable for electrocoat compositions.

The resin may incorporate certain nonionizable monomers that may impart or improve water dispersibility, including, without limitation, those having a carboxylic acid group in which the carbonyl carbon is separated from the closest ethylenically unsaturated carbon by at least four atoms including oligomers of (meth)acrylic acid, particularly β-carboxyethyl acrylate, and the reaction products of hydroxyalky (meth) acrylates (e.g., hydroxyethyl methacrylate, hydroxypropyl acrylate) with cyclic carboxylic acid anhydrides (e.g., succinic anhydride, isophthalic anhydride), such as monomethacryloyloxyethyl hexahydrophthalate; those having ether chains such as ω-methyloxy-polyoxyethylene (meth)acrylates, ω-methyloxy-poly(oxyethylene-ω-oxypropylene) (meth)acrylates, co-methyloxy-polyoxyethylene (meth)acrylates, ω-methyloxy-poly(oxyethylene-co-oxypropylene) (meth)acrylates, ω-amino-polyoxyethylene (meth)acrylates, ω-amino-poly(oxyethylene-co-oxypropylene) (meth)acrylates, acid-functional reaction products of ω-methyloxy-polyoxyethylene (meth)acrylates, ω-methyloxy-poly(oxyethylene-co-oxypropylene) (meth)acrylates, ω-hydroxy-polyoxyethylene (meth)acrylates, and ω-hydroxy-poly(oxyethylene-co-oxypropylene) (meth)acrylates with cyclic anhydrides, beta- and gamma-carbamyloxyhydroxyalkyl (meth)acrylates such as 2-carbamyloxy-3-hydroxypropyl methacrylate and 3-carbamyloxy-2-hydroxypropyl methacrylate.

In some embodiments, the granular coating feedstock is used to form an aqueous, anionic coating dispersion. Examples of suitable acid-functional monomers include, without limitation, α,β-ethylenically unsaturated monocarboxylic acids containing 3 to 5 carbon atoms, α,β-ethylenically unsaturated dicarboxylic acids containing 4 to 6 carbon atoms and the anhydrides and monoalkyl esters of these. Examples also include, without limitation, acrylic acid, methacrylic acid, crotonic acid, maleic acid or maleic anhydride, fumaric acid, itaconic acid or itaconic anhydride, acryloxypropionic acid, and so on. A sufficient amount of acid-functional monomer is included to produce an emulsion polymer with an acid number of at least about 1, and preferably the emulsion polymer has an acid number of from about 1 to about 10.

Examples of co-monomers that may be polymerized with the monomer providing reactive groups and (if included) the acid-functional monomer include, without limitation, derivatives of α,β-ethylenically unsaturated monocarboxylic acids containing 3 to 5 carbon atoms, including esters, nitrites, or amides of those acids; diesters of α,β-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acid amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, tert-butyl styrene, and 2-vinyl pyrrolidone.

In various embodiments, cationic or anionic acrylic resins may be used. In the case of a cationic acrylic resin, the resin is polymerized using an amino acrylate such as N,N'-dimethylaminoethyl methacrylate, tert-butylaminoethyl methacrylate, 2-vinylpyridine, 4-vinylpyridine, vinylpyrrolidine or other such amino monomers. Alternatively, epoxy groups may be incorporated by including an epoxy-functional monomer in the polymerization reaction. Such epoxy-functional acrylic polymers may be made cathodic by reaction of the epoxy groups with amines according to the methods previously described for the epoxy resins. The molecular weight of a typical acrylic resin is usually in the range from about 2000 to about 50,000, and preferably from about 3000 to about 15,000.

The amino equivalent weight of the cationic resin can range from about 150 to about 5000, and preferably from about 500 to about 2000. The hydroxyl equivalent weight of the resins, if they have hydroxyl groups, is generally between about 150 and about 2000, and preferably about 200 to about 800.

The polymerizable, ethylenically unsaturated monomer can also include a mixture of compounds with groups reactive with a curing agent. Such compounds can include more than one resin with groups reactive with a curing agent, a resin with one or more co-monomers, and more than one resin with at least one co-monomer. As used herein the terms curing agent and crosslinker or crosslinking agent are interchangeable.

A solid or viscous curing agent is melted with the resin in forming a granular coating feedstock. The curing agent should be selected such that the resultant blend of resin and curing agent is a solid suitable for grinding and subsequent storage. Use of a low viscosity curing agent can result in sintering of the granular coating feedstock depending on the desired storage temperature.

The curing agent includes crosslinking agents capable of reacting with the resin. Examples of suitable curing agents include, without limitation, solid blocked polyisocyanate compounds such as self-blocking uretdione compounds, caprolactam- and oxime-blocked polyisocyanates, isocyanurates of diisocyanates, diioscyanates half-blocked with polyols, and combinations thereof. Other examples include crosslinkers such as urethane crosslinkers. Urethane crosslinkers further include polymeric MDI (an oligomer of 4,4'-diphenylmethane diisocyanate) that is blocked with an ethylene glycol ether or a propylene glycol ether. Such urethane crosslinkers can be prepared, for example, from Lupranate® M20S, or other similar commercially available materials. Other urethane crosslinkers include blocked toluene diisocyanate (TDI) and 1,6-hexamethylene diisocyanate (HDI) compounds. Polyisocyanate compounds are commercially available from, among others, Degussa AG, Bayer Polymers, LLC, and BASF AG. Other crosslinker agents can be used, as long as they do not make the (formerly molten and blended) solid resin-agent too soft to be ground into a powder or granulate at the temperature chosen for the grinding step.

In some embodiments, UV and/or actinic radiation activated crosslinkers can be used. An example of an actinic curable material is tris[2-(acryloyloxy)ethyl] isocyanate. Furthermore, if the UV and/or actinic radiation activated crosslinker is not dispersible in water, it may be stabilized by a second resin that can act as a surfactant. However, in most cases, an actinic radiation curable functional group can be reacted with a resin or crosslinker that already contains water stabilizing groups. Suitable examples include the reaction of some of the epoxy groups on bisphenol A (Araldite® GY2600) with acrylic acid, or the reaction of hydroxyethyl acrylate with a poly-isocyanate such as polymeric MDI (polymethylene polyphenylisocyanate containing 4,4'-diphenylmethane diisocyanate). In some cases, the acrylate can also be used as the blocking agent for the isocyanate. For example, the acrylate functional group on the polymeric MDI can undergo crosslinking with other acrylate functional materials, either on the other polymeric MDI molecules, or on other resin materials. Once the deblocking temperature is reached, the isocyanate group can then be reformed.

In the context of the present description, actinic radiation includes electron beams or, preferably, UV radiation. Curing by UV radiation is normally initiated by free-radical and/or ionic photoinitiators and, in terms of its mechanism, is usually a free-radical and/or cationic photopolymerization.

The coating composition can thus also include at least one material that can initiate the free radical or ionic polymerization. If the coating composition is to be crosslinked with UV radiation, the use of a photoinitiator is generally necessary. Where such initiators are used, they are present in the coating composition in fractions of preferably from 0.1 to 10% by weight, from 1 to 8% by weight, and in particular from 2 to 6% by weight, based in each case on the overall weight of the coating composition.

Examples of suitable photoinitiators are those of the Norrish II type, whose mechanism of action is based on an intramolecular variant of the hydrogen abstraction reactions that occur in diverse photochemical reactions (by way of example, reference is made to Rompp Chemie Lexikon, 9th expanded and revised edition, Georg Thieme Verlag, Stuttgart, Vol. 4, 1991) or cationic photoinitiators (by way of example, reference is made to Rompp Lexikon Lacke und Druckfarben, Georg Thieme Verlag Stuttgart, 1998, pages 444 to 446), especially benzophenones, benzoins or benzoin ethers, or phosphine oxides. It is also possible to use, for example, products available commercially under the names Irgacure® 184, Irgacure® 1800 and Irgacure® 500 from Ciba Geigy, Grenocure® MBF from Rahn, and Lucirin® TPO from BASF AG. Suitable photoinitiators are also described in U.S. Pat. No. 6,716,891, incorporated herein by reference.

Besides the photoinitiators, customary sensitizers such as anthracene can be used in effective amounts. Furthermore, the coating material can comprise at least one thermolabile free radical initiator and/or ionic initiator. At from 80° C. to 120° C., these initiators form radicals which start the crosslinking reaction. Examples of thermolabile free-radical initiators are organic peroxides, organic azo compounds or O—O cleaving initiators such as dialkyl peroxides, peroxocarboxylic acids, peroxodicarbonates, peroxide esters, hydroperoxides, ketone peroxides, azo dinitriles or benzopinacol silyl ethers. O—O cleaving initiators are particularly preferred, since thermal cleavage of O—O cleaving initiators does not produce any gaseous decomposition products which might lead to defects in the coating film. Where used, amounts of O—O cleaving initiators are generally from 0.1 to 10% by weight, preferably from 0.5 to 8% by weight, and in particular from 1 to 5% by weight, based in each case on the overall weight of the coating composition. These thermolabile initiators can also be used in conjunction with photoinitiators, for example, to overcome oxygen induced surface inhibition of UV initiated free radical curing.

In some cases, materials that form hydroperoxides during the bake cycle can be used. Materials that form hydroperoxides offer stability advantages in coating compositions in comparison to azo or peroxide materials. Non-limiting examples of such materials are allylic esters, ethers, and urethanes that can be incorporated into the resin or crosslinker by reaction of allyl alcohol.

A resin and a curing agent are mixed at a temperature at or above the melting point of the resin and agent in order to form a homogeneous molten blend. The mixing temperature can also be lower than the curing temperature of the mixture. For example, the resin and agent can be mixed and melted in a suitable reactor container or an extruder until a homogenous blend is formed. Furthermore, the reactor can be blanketed with an inert atmosphere, such as nitrogen.

The homogeneous blend of resin and curing agent, that was melted and mixed, is cooled to form a solid. Cooling can be done at any temperature below the melting points of the resin and the curing agent, so long as the blended resin and agent solidify. Such temperatures can include room temperature or temperatures below room temperature. The cooling can also include refrigerating or freezing the blend. The blend can also be cooled in stages. For example, the blend can be allowed to solidify below the melting points of the resin and the curing agent, and then the temperature reduced to where the solid blend exhibits brittleness and is capable of being granulated. An example of cooling in stages includes cooling the melted and blended resin and agent at room temperature until relatively solid, then placing the solid in a freezer at −10° C.

Some resins, copolymers, and curing agents are not solid at room temperature. In this case, the resin, copolymer (if included), and curing agent can be blended while molten, but must be cooled below room temperature once a homogeneous blend is formed. Such a mixture of resin and curing agent must be maintained at the refrigerated or frozen state during and after grinding in order to prevent substantial sintering of the granulate. The amount of sintering should be kept to a minimum so that the solid granulate does not form aggregates that interfere with subsequent handling and weighing of the material in preparing a coating dispersion.

Cooling of the resin and curing agent blend can be done in the reactor used in the melting and mixing step. Or, the blend can be poured onto metal trays, or other suitable trays, to cool, forming solid sheets. The solid sheets are then broken up and fed to an appropriate grinder. The cooling can also be done as part of a continuous method that combines the mixing, melting, blending, cooling, and grinding stages. The solid blend can be further cooled to a temperature where it is brittle, if necessary, and can be ground as either a solid mass or by first breaking the solid blend into smaller pieces.

Other methods of mixing and blending typically known in the art can be used. For example, such methods include the use of an extruder and/or a continuous forming apparatus that blends, mixes, extrudes, cools, solidifies, and finally pulverizes the resin and curing agent to form a granular coating feedstock.

A resin and curing agent blend is cooled to a temperature where it is brittle and can be effectively ground into a powdered or granular form. Grinding can be done by various methods typically known in the art, for example, any grinding method that results in a granular form, preferably a form that can easily pour or flow in order to facilitate material handling. Other granular forms, such as pellets, that can be scooped, fed through a hopper, or transferred by a mechanical material handling apparatus are possible. For example, grinding can be done to reduce a solid resin-crosslinker mixture to particles of about 0.5 mm to about 4 mm in size. Alternatively, the solid resin and curing agent blend can be shipped and/or stored and later crushed or ground into a granular form at the coating composition preparation site, prior to forming a dispersion.

A granular coating feedstock can be substantially insoluble in water without a salting agent being present. Examples of the present compositions include granular, solid resin-crosslinker mixtures (i.e., blends of resin and curing agent) that are substantially insoluble in water without a salting agent. Other granular coating feedstocks can have low solubility in water unless mixed with at least one salting agent.

A coating feedstock can be stored and/or shipped to a destination for completion of preparation of an aqueous coating composition. The feedstock can be stored or transported at a storage temperature that prevents sintering; for example, the temperature can be below the melting temperatures of the resin and the curing agent. An example of a storage temperature is the same temperature used in the grinding step, where the solid resin and curing agent blend has a brittle character.

The solid coating feedstock granulate can be dispersed in an aqueous medium directly, shipped to a coating preparation site, or stored as necessary. The feedstock is mixed with water, and other additives as needed, to form an aqueous coating composition. The concentration of coating feedstock in the aqueous medium is, in general, not critical, but ordinarily the major portion of the aqueous dispersion is water. The aqueous dispersion of the coating composition can contain from about 3 to 60 percent, preferably 10 to 40 percent by weight solids. Aqueous coating compositions which are to be further diluted with water, generally range from 10 to 30 percent by total weight solids. Additional limitations on the amount of solid in an aqueous coating composition are often based on the equipment used to handle the aqueous dispersion, the viscosity of the aqueous dispersion, and the ability of the aqueous dispersion to be filtered, as is typically performed in the art.

Optionally, crushing or grinding of the solid coating feedstock can be done at the coating preparation site. For example, the solid blend of resin and curing agent can be stored and/or shipped to a coating preparation site. The solid blend of resin and curing agent could be in the form of large chunks, bricks, or sheets, for example. The solid resin and curing agent can then be ground at the coating preparation site to form a granular coating feedstock, where the granulate is more easily dispersed into an aqueous medium. Once the granular feedstock is dispersed, and optional additives are added, an aqueous coating composition is formed.

A resin is preferably reacted or "salted" with an acid for use in a cathodic electrocoating composition of the invention. This reaction may be termed "neutralization" or "acid-salted" and specifically refers to the reaction of pendent amino groups with an acidic compound in an amount sufficient to neutralize enough of the basic amino groups to impart water-dispersibility to the resin. Illustrative acid compounds include phosphoric acid, propionic acid, acetic acid, lactic acid, formic acid, or citric acid. Lactic acid is a preferable acid compound. Or, depending on the resin, it can be salted with a base to make an anodic electrocoating composition. For example, ammonia or amines such as dimethylethanol amine, triethylamine, amino methyl propanol, methylethanol amine, and diethanol amine can be used to form an anodic electrocoating composition.

An aqueous coating composition of the present invention can also include at least one additive. Many types of additives are known to be useful in electrocoating and include, but are not limited to, various organic solvents, surfactants, dispersants, additives to increase or reduce gloss, flow agents, catalysts, pigments, and salting agents. Additional additives, for example hindered amine light stabilizers, ultraviolet light absorbers, anti-oxidants, surfactants, stabilizers, wetting agents, rheology control agents, dispersing agents, adhesion promoters, plasticizers, etc. may be incorporated into the coating composition. Such additives are well-known and may be included in amounts typically used for coating compositions. Additives can be mixed into the coating composition once the granular, solid resin-crosslinker mixture is added to water. The aqueous mixture plus additives is then dispersed to form a homogeneous aqueous coating composition.

The aqueous medium of a coating dispersion is generally exclusively water, but a minor amount of organic solvent can be used. Examples of useful solvents include, without limitation, ethylene glycol butyl ether, propylene glycol phenyl ether, propylene glycol propyl ether, propylene glycol butyl ether, diethylene glycol butyl ether, dipropylene glycol methyl ether, propylene glycol monomethyl ether acetate, xylene, N-methylpyrrolidone, methyl isobutyl ketone, mineral spirits, butanol, butyl acetate, tributyl phosphate, dibutyl phthalate, and so on. However, organic solvent can be avoided to minimize organic volatile emissions from the coating process.

Examples of suitable surfactants include, without limitation, the dimethylethanolamine salt of dodecylbenzene sulfonic acid, sodium dioctylsulfosuccinate, ethoxylated nonylphenol, sodium dodecylbenzene sulfonate, the Surfynol® series of surfactants (Air Products and Chemicals, Inc.), and Amine-C (Huntsman). Generally, both ionic and non-ionic surfactants may be used together, and, for example, the amount of surfactant in an electrocoat composition may be from 0 to 2%, based on the total solids. Choice of surfactant can also depend on the coating method. For example, an ionic surfactant should be compatible with the particular electrocoating composition, whether it cathodic or anodic.

The coating composition may include a catalyst to enhance the cure reaction, for example, Lewis acids, zinc salts, tin salts, and bismuth compounds.

When the coating composition is a primer composition or pigmented topcoat composition, such as a basecoat composition, one or more pigments and/or fillers may be included. Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Pigments can be added to the coating composition as discussed above. The pigment may include a surface treatment or may be free of any surface treatment.

Coating compositions formed according to the methods described herein can be coated on an article by any of a number of techniques well-known in the art. These include, for example, spray coating, dip coating, roll coating, curtain coating, and the like. In particular embodiments, the coating composition of the invention is electrodepositable and is coated onto the substrate by electrodeposition. The electrodeposited or applied coating layer is cured by reaction of a resin and curing agent to produce a cured coating layer on the substrate.

The coating composition can be applied onto many different substrates, including metal substrates such as bare steel, phosphated steel, galvanized steel, or aluminum; and non-metallic substrates, such as plastics and composites. In electrocoating (e.g., electrodeposition) or electrospray, only electrically conductive substrates are used. The substrate may also be any of these materials having upon it already a layer of another coating, such as a layer of an electrodeposited primer, primer surfacer, and/or basecoat, either cured or uncured.

The coating composition can be electrodeposited as is conventionally performed in the art. Electrodeposition includes immersing an electrically conductive article in an electrocoating bath of the present invention, connecting the article as the cathode or anode, preferably as the cathode, depositing a coating composition film on the article using direct current, removing the coated article from the electrocoating bath, and subjecting the deposited electrocoated material film to conventional thermal curing, such as baking.

Although various methods of curing may be used, heat-curing is preferred. Generally, heat curing is effected by heating at a temperature and for a length of time sufficient to cause the reactants (i.e., the resin and curing agent) to form an insoluble polymeric network. The cure temperature is usually from about 150° C. to about 200° C. for electrocoating compositions, and the length of cure is usually about 15 minutes to about 60 minutes. Cure temperature can be lower, for example, around 120° C. for melamine based coatings and even lower bake temperatures can be used in some instances. Heating can be done in infrared and/or convection ovens.

Additional, non-limiting examples of thermal curing include the reaction between isocyanate (free or blocked) with an active hydrogen functional group such as a hydroxyl or primary or secondary amine; or that between an aminoplast and an active hydrogen material such as a carbamate, urea, amide or hydroxyl group; an epoxy with an active hydrogen material such as an acid, phenol, or amine; a cyclic carbonate with an active hydrogen material such as a primary or secondary amine; a silane (i.e., Si—O—R where R=H, an alkyl or aromatic group, or an ester) with an active hydrogen material, including when the active hydrogen material is Si—Ohio, as well as mixtures of these crosslinking pairs. When required, a catalyst can be used to accelerate these reactions and several catalysts are well known in the art. Non-limiting examples are Brønsted acids and bases such as sulfonic acids, or sodium hydroxide, or Lewis acids and bases such as dibutyl tin oxide, dibutyl tin dilaurate, zinc oxide, bismuth oxide, tin oxide, yttrium oxide, copper oxide and combinations thereof or tertiary amines.

Other embodiments include coating compositions where curing is by actinic radiation. Actinic radiation cured systems are those that require the generation of a radical to cure. Non-limiting examples are the exposure of activated vinyl materials like acrylic functional materials, oligomers, and/or polymers to UV light. When required, photoinitiators can be used to help accelerate the reaction. While most of these reactions will be based on free radical chemistry, it is also known to use UV light to initiate a cationic or anionic polymerization reaction. Additionally, materials designed to undergo UV cure can undergo crosslinking under thermal means when a free radical initiator, such as a peroxide or azo material is added. When heated, these systems decompose to form free radicals which can then be used to initiate the cure of the activated vinyl functional groups. Similar to thermal cured systems, a mixture of different functional groups that can be cured by actinic radiation can be used.

Incorporation of a functional group that can undergo actinic induced crosslinking is well known in the art. One such example includes a (meth)acrylate monomer that contains a functional group that is reactive towards a functional group on the resin oligomer and or polymer. Examples further include the reaction of an acid functional (meth)acrylate monomer such as (meth)acrylic acid with an epoxy group on the resin. Non-limiting examples of other reactants include isocyanate with an activated hydroxy group, like a hydroxy or amine, or any of the other suitable reaction pairs described in the thermal curing embodiments.

In some cases, there is no need to incorporate the actinic radiation curable material into a larger resin material. For example, poly-acrylates such as 1,6-hexanediol diacrylate or active vinyl groups connected to resin having an isocyanuate can be used. When the actinic functional group is on a separate resin, polymer or monomer, the principle resin material must be used to carry it into the powder form and to stabilize it once it is reconstituted into a liquid system.

In some cases, it is desirable to have a dual cure system that uses a mixture of one or more thermal cured crosslinking systems with one or more actinic cured systems. Examples include instances where an actinic crosslinked system is used to initially increase the rheology of the coating composition until the temperature is high enough so that a thermal cured system can then be used. As is known in the art, the thermal and actinic cured functional groups can be on the same resin or on different resins. For example, (meth)acrylic acid can be added during the normal epoxy upgrade of a typical electro-coat resin.

The invention is further described in the following example. The example is merely illustrative and does not in any way limit the scope of the invention as described and claimed. All parts given are parts by weight unless otherwise noted. Tradename compounds suitable for practicing embodiments of the invention are included in parentheses, where applicable.

EXAMPLES

Example 1

Preparation of a Granular, Solid Resin-Crosslinker Mixture

An exemplary formulation is made by charging a suitable reactor vessel with 345.4 parts diglycidyl ether of bisphenol A (Araldite®) GY2600), 79.4 parts bisphenol A, 27.3 parts phenol, and 10.8 parts propylene glycol butyl ether. The contents of the reactor vessel are blanketed with nitrogen and the reactor vessel is heated to 110° C. At this point, 0.45 parts triphenylphosphine and 0.6 parts more of propylene glycol butyl ether are added, whereupon the temperature is raised to 180° C. to 200° C. The reactor vessel is allowed to cool and is held at 135° C. for 35 minutes.

Polyol (Puracol® P710R) at 45.6 parts is added and the reactor vessel is cooled to 97° C. Next, 33.6 parts of diethanolamine is added, whereupon the temperature is raised to about 110° C. in 30 minutes. Dimethylaminopropylamine at 16.3 parts and 1.8 parts more of propylene glycol butyl ether are added, with the temperature raising to about 140° C. to about 145° C. The reactor vessel is then cooled to 135° C. where it is held for at least 2.5 hours.

At this point, without heating, 263.3 parts of a solid or high solids urethane crosslinker is added. The urethane crosslinker is composed of polymeric MDI (polymethylene polyphenyl-isocyanate containing 4,4'-diphenylmethane diisocyanate) that is blocked with an ethylene glycol ether. The reactor vessel contents are mixed until homogeneous while heating to 120° C. At 120° C. 1746 grams of the resin-curing agent mixture are combined with 0.6% carbon black pigment, 3.9% clay filler, 13.3% titanium dioxide and 1.6% dibutyl tin oxide, where all percentages are weight percent, based on total solids weight. The contents are poured onto a large sheet of aluminum foil and allowed to cool. Once at room temperature, the solid resin-crosslinker mixture is peeled from the foil and placed at −10° C. When the solid resin-crosslinker mixture has achieved a brittle state, it is broken into small pieces and run through a grinder to reduce the particle size to about 0.5 mm to about 4 mm. The resulting granular, solid resin-crosslinker mixture is stored at −10° C. to prevent sintering.

Example 2

Preparation of Coating Composition

An aqueous coating composition is formed by mixing

| Deionized water | 610.0 g |
|---|---|
| 88% formic acid in water | 6.3 g |
| n-butyl ether | 10.1 g |
| Propylene glycol phenyl.ether | 6.7 g |
| Pigmented resin/crosslinker mix (Ex. 1) | 500.0 g |
| Deionized water | 1340.0 g |

610 grams of water, formic acid, n-butyl ether and ethers, in the amounts specified above, are introduced into a suitable mixing container. These liquids are blended together and the granular, solid resin-crosslinker mixture, as prepared according to Example 1 is slowly added. The composition is mixed until a dispersion is formed, with cooling as necessary. Other additives can be added at this point, such as a surfactant.

Next, an additional 1340 grams of $H_2O$ is added and the coating composition is mixed thoroughly to achieve a homogeneous dispersion. The coating composition is then filtered as necessary. Application of the aqueous coating composition to an article is done by methods generally known in the art, such as for example, by electrodeposition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of producing an aqueous coating composition comprising:
   forming a solid pigmented resin-crosslinker mixture by a method comprising:
      blending an ionizable resin having pendent amino groups, a curing agent, and a pigment until homogenous at a temperature wherein the resin and the curing agent are molten; and
      cooling the blended resin, curing agent, and pigment until solid;
   thereby producing the solid pigmented resin-crosslinker mixture;
   shipping the solid pigmented resin-crosslinker mixture to a coating completion site; and
   dispersing the solid pigmented resin-crosslinker mixture in water, wherein dispersing further includes adding an acidic salting agent;
   thereby producing the aqueous coating composition, wherein the resin in the aqueous coating composition is neutralized by the acidic salting agent, rendering the resin water-dispersible and the aqueous coating composition cathodically electrodepositable.

2. The method of producing an aqueous coating composition according to claim 1, further comprising:
   grinding the solid pigmented resin-crosslinker mixture into a powdered or granular form before the shipping step.

3. The method of producing an aqueous coating composition according to claim 1, further comprising:
   grinding the solid pigmented resin-crosslinker mixture into a powdered or granular form before the dispersing step.

4. The method of producing an aqueous coating composition according to claim 1, wherein the pigment has a surface that is pre-treated with a surface treatment.

5. The method of producing an aqueous coating composition according to claim 1, wherein the pigment has no surface pre-treatment.

6. The method of producing an aqueous coating composition according to claim 1, wherein the blending step further includes a catalyst.

7. A method of producing an aqueous coating composition comprising:
   forming a solid pigmented resin-crosslinker mixture by a method comprising:
      blending an ionizable resin having pendent amino groups and a curing agent until homogenous at a temperature wherein the resin and the curing agent are molten;
      cooling the blended resin and curing agent until solid to form a solid resin-crosslinker mixture;
      grinding the solid resin-crosslinker mixture into a powdered or granular form; and
      mixing the powdered or granular solid resin-crosslinker mixture and a pigment to form the solid pigmented resin-crosslinker mixture;
   shipping the solid pigmented resin-crosslinker mixture to a coating completion site; and
   dispersing the solid pigmented resin-crosslinker mixture in water, wherein dispersing further includes adding an acidic salting agent;
   thereby producing the aqueous coating composition, wherein the resin in the aqueous coating composition is neutralized by the acidic salting agent, rendering the resin water-dispersible and the aqueous coating composition cathodically electrodepositable.

8. The method of producing an aqueous coating composition according to claim 7, wherein the pigment has a surface that is pre-treated with a dispersion agent.

9. The method of producing an aqueous coating composition according to claim 7, wherein the pigment has a cationic surface treatment.

10. The method of producing an aqueous coating composition according to claim 7, wherein the mixing step or the blending step further includes a catalyst.

11. A method of producing an aqueous coating composition comprising:
    forming a solid dyed resin-crosslinker mixture by a method comprising:
       blending an ionizable resin having pendent amino groups, a curing agent, and a dye until homogeneous at a temperature wherein the resin and curing agent are molten;
       adding liquid catalyst to the molten blend;
       cooling the molten blend to form a solid blend; and
       grinding the solid blend to a powdered or granular form;
       thereby producing said solid dyed resin-crosslinker mixture;
    shipping the solid dyed resin-crosslinker mixture to a coating completion site; and
    dispersing the solid dyed resin-crosslinker mixture in water, wherein dispersing further includes adding an acidic salting agent;
    thereby producing the aqueous coating composition, wherein the resin in the aqueous coating composition is neutralized by the acidic salting agent, rendering the resin water-dispersible and the aqueous coating composition cathodically electrodepositable.

12. A method of coating an article comprising:
    preparing a feedstock for an aqueous coating composition by a process comprising:
       blending a resin, a curing agent, and a pigment at a mixing temperature at or above the melting points of the resin and the curing agent to form a molten blend, wherein the resin is ionizable and has pendent amino groups; and
       cooling the molten blend to form a solid blend;
    dispersing the feedstock, an acidic salting agent, and at least one additive in water;
    thereby producing said aqueous coating composition, wherein the resin in said aqueous coating composition is neutralized by the acidic salting agent, rendering the resin water-dispersible and the aqueous coating composition cathodically electrodepositable; and
    applying the composition to the article by cathodic electrodeposition.

13. The method of claim 12, further comprising grinding the solid blend to produce a powdered or granular form.

14. The method of claim 12, wherein the pigment has a surface that is pre-treated with a dispersion agent.

15. The method of claim 12, wherein the pigment has no surface treatment.

16. The method of claim 12, wherein the blending step further includes a catalyst.

17. A method of coating an article comprising:
    preparing a feedstock for an aqueous coating composition by a process comprising:

blending a resin and a curing agent at a mixing temperature at or above the melting points of the resin and the curing agent to form a molten blend, wherein the resin is ionizable and has pendent amino groups;
cooling the molten blend to form a solid blend;
grinding the solid blend to produce a powdered or granular form; and
mixing the powdered or granular form and a pigment;
dispersing the feedstock, an acidic salting agent, and at least one additive in water;
thereby producing said aqueous coating composition, wherein the resin in said aqueous coating composition is neutralized by the acidic salting agent, rendering the resin water-dispersible and the aqueous coating composition cathodically electrodepositable; and
applying the composition to the article by cathodic electrodeposition.

18. The method of claim 17, wherein the pigment is surface treated with a dispersion agent.

19. The method of claim 17, wherein the pigment has no surface treatment.

* * * * *